Figure 1:
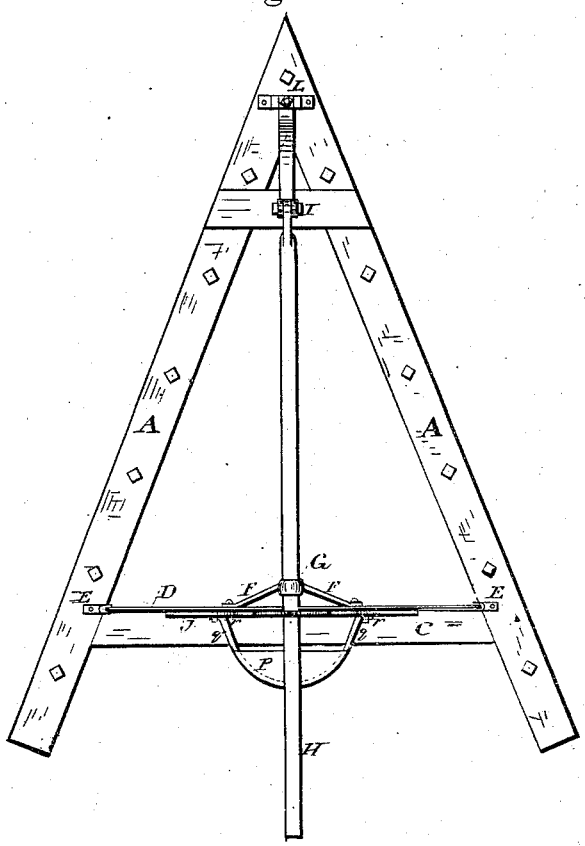

(No Model.)

G. W. BURRIER.
Combined Harrow and Leveler.

No. 231,650. Patented Aug. 31, 1880.

Witnesses
R. H. Brown
James Butler

Inventor
G. W. Burrier
per John W. Parker
Attorney

UNITED STATES PATENT OFFICE.

GEORGE W. BURRIER, OF LYON COUNTY, ASSIGNOR OF ONE-HALF OF HIS RIGHT TO JOHN ROTHENBUCHER, OF VIRGINIA CITY, NEVADA.

COMBINED HARROW AND LEVELER.

SPECIFICATION forming part of Letters Patent No. 231,650, dated August 31, 1880.

Application filed May 17, 1880. (No model.)

*To all whom it may concern:*

Be it known that I, G. W. BURRIER, of Lyon county, State of Nevada, have invented a new and useful Combined Harrow and Leveler, of which the following is a specification.

In the western States there is a large amount of land which it is necessary to irrigate with water before it will produce a crop, and for this purpose the soil requires to be level—that is, all the little depressions to be filled in and the little elevations cut down.

My invention relates to improvements in the common V-harrow; and the objects of my improvements are, first, to unite with the uses of the harrow those of a leveler, for the purpose of leveling the soil for the needs of irrigation; and, second, to provide a better method of attaching the drawing-chain in front. I attain these objects by the mechanism illustrated in the accompanying drawings, in which—

Figure 2:
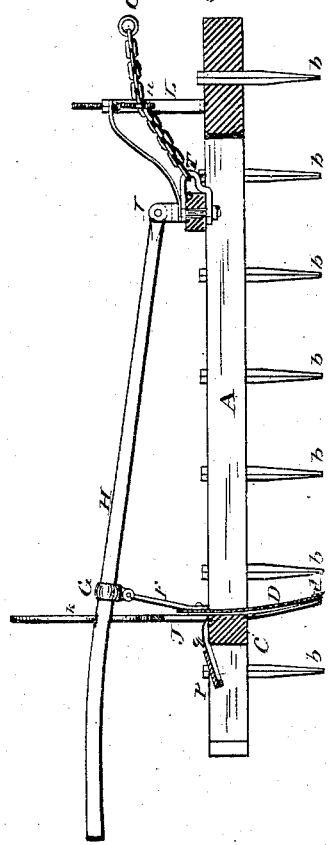
Figure 3:
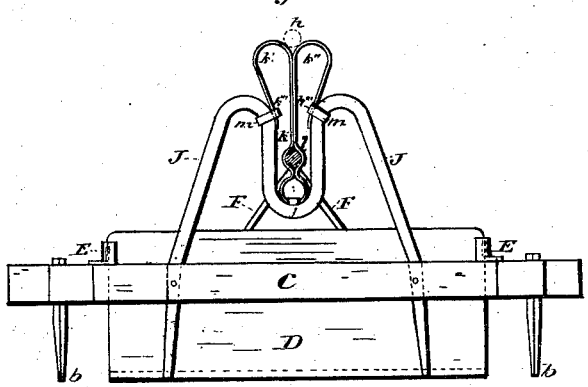
Figure 4:

Figure 1 is a ground plan. Fig. 2 is a sectional elevation, the section being cut through Fig. 1. Fig. 3 is an end elevation, and Fig. 4 is a detail view of the piece L.

Similar letters refer to similar parts throughout the several views.

A A is the wooden frame of the harrow, through which go the teeth $b\,b\,b$, &c. C is the rear brace of the harrow. Immediately in front of this brace I place a scraper, D, made slightly curved in form, as shown in Fig. 2. It is constructed of thin metal, and is provided at the lower edge with a strip of steel, $d$. The scraper works perpendicularly in the two guides E E, one on each side. The scraper is fastened by the rods F F and the sleeve G to the long lever H, which is for the purpose of raising and lowering the scraper. The lever has its fulcrum at I, the handle projecting a short distance beyond the end of the harrow.

To the forward side of the brace C, and immediately in the rear of the scraper, I fasten the frame J, made as shown by Fig. 3. To this frame, at $j$, I attach the long spring $k$, which incloses the lever at $l$, and then ascends, making the two loops $k'$ and $k''$, the ends of the spring working loosely against the frame at $k'''$. The ends of the spring are prevented from slipping from the frame by the small clips $m\,m$. The use of this spring is to hold the lever in place in both positions-when the scraper is down, as shown in the drawings, and when it is lifted, when out of use, to the position shown by the dotted circle $h$.

P is a foot-board fastened to the rod $q$, which rod is hinged to the rear part of the scraper at $r\,r$. The use of this foot-board is for the purpose of assisting in raising the scraper. The weight of the driver being placed on the board P, it presses down on the rear brace of the harrow C, and exerts a lifting force on the scraper to start it.

Heretofore it has been one of two evils in the methods adopted for attaching the drawing-power to the harrow, if a short connection was made with the horses the upward tendency of the pull would lift several of the forward teeth of the harrow clear of the ground entirely, rendering them useless. The only remedy for this has been to make a long connection between the horse and the harrow, making the angle of the drawing-chain with the harrow very oblique, and reducing the upward tendency of the pull practically to nothing; but in remedying one evil another has been encountered, which is, that with a long connection it is impossible to reach close into the corners of a field, a long turn being necessary. My improved method of connecting the chain with the harrow overcomes both of these evils, and is as follows:

To the forward end of the harrow I fasten the fork-shaped piece L. (Shown in detail by Fig. 4.) Through the top of this piece I put the eyebolt $n$. By means of a nut I am able to raise and lower this eyebolt to whatever height I may desire. I attach the drawing-chain O to the forward end of the harrow at T. I then pass it up through the ring of the eyebolt, and thence extend it a short distance outward, where it can be attached to the doubletree of the horses. The effect of this arrangement is to produce a slight downward tendency to the forward end, even when a short connection is made with the horses.

The operation of my machine is as follows: If it is desired to use the machine as a harrow merely, the handle of the lever H is lifted until it occupies the position shown by the dotted circle $h$, Fig. 3. This lifts the scraper entirely from the ground and to a position where it does not act. If it is desired to use the machine for leveling, the scraper is pushed down to the position shown in the drawings, the bottom edge being even with the bottom of the harrow-teeth. When the machine is in motion with the scraper in this position the earth accumulates within the interior triangular space between the harrow-teeth and the scraper until the space becomes entirely full. When any depression is encountered the scraper is lifted by the driver sufficiently to empty this interior space, and is then dropped again to repeat the same operation. The motion of the earth while being hauled along within this interior space is a rolling one, the partially-broken clods rolling over and over, being thus pulverized much finer than the harrow-teeth can accomplish it.

I am aware that scrapers made adjustable in either a horizontal or vertical direction have been combined with land-levelers; but I am not aware that an adjustable scraper operating through vertical side grooves or guides has heretofore been combined with a harrow.

What I claim as my invention, and desire to secure by Letters Patent, is—

1. The combination, with a harrow, of the scraper D, made vertically adjustable by the spring $k$, and constructed to operate through vertical guides attached to the sides of the harrow-frame, substantially as described, and for the purpose specified.

2. The combination, in a V-harrow, of the scraper D, lever H, and foot-lever P $q$, substantially as described, and for the purpose specified.

3. In combination with a V-harrow, the vertically-operating scraper D, lever H, frame J, and spring K, constructed substantially as described, and for the purpose specified.

GEORGE WASHINGTON BURRIER.

Witnesses:
JOHN W. PARKER,
J. ROTHENBUCHER.